(No Model.)
P. L. BRADY.
NUT LOCK.
No. 380,712. Patented Apr. 10, 1888.
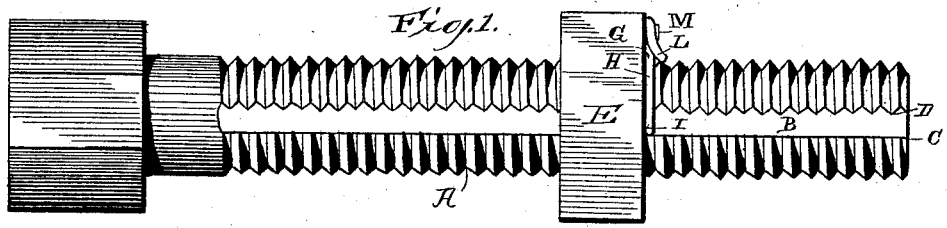
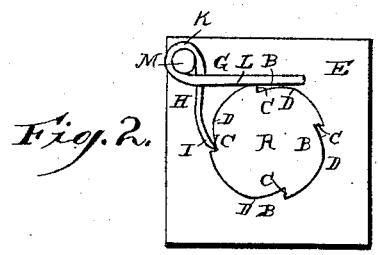
Witnesses,
Henry G. Dieterich
John H. Siggers
Inventor,
Peter L. Brady.
By his Attorneys,

UNITED STATES PATENT OFFICE.

PETER LEWIS BRADY, OF HEARNE, TEXAS.

NUT-LOCK.

SPECIFICATION forming part of Letters Patent No. 380,712, dated April 10, 1888.

Application filed July 20, 1887. Serial No. 244,828. (No model.)

*To all whom it may concern:*

Be it known that I, PETER LEWIS BRADY, a citizen of the United States, residing at Hearne, in the county of Robertson and State of Texas, have invented a new and useful Improvement in Nut-Locks, of which the following is a specification.

My invention relates to an improvement in nut-locks; and it consists in the peculiar construction and combination of devices that will be more fully set forth hereinafter, and particularly pointed out in the claim.

In the accompanying drawings, Figure 1 is an elevation of a bolt provided with a nut-locking device embodying my improvement. Fig. 2 is an end elevation of the same. Fig. 3 is a detached perspective view of the combined spring and pawl or detent.

A represents a bolt, which is provided with a series of longitudinal grooves, B, which extend along its threaded portion, the said grooves having a shoulder, C, on one side, and having the opposite sides inclined, as at D.

E represents a nut, which screws onto the bolt in the usual manner.

In order to lock the nut to the bolt, I provide a latch or locking device, G, formed from a single piece of wire, which is bent to form the detent H, having the depending point I, an eye, K, at the upper end of the detent, and a spring-arm, L, extending from the said eye, as clearly shown. In order to attach this device to the nut, I provide the latter on its face, at one corner, with a projecting stud, M, over which the eye of the spring-detent is passed, and the outer end of the stud is then swaged, so as to prevent the detent from becoming accidentally detached therefrom. The spring-arm is thus caused to bear against one side of the threaded stem of the bolt, and the detent or pawl bears against the same at right angles to the spring-arm. When the nut is being screwed on the bolt, the spring-pawl slips freely over the grooves therein and offers no impediment to the rotation of the nut. When the nut is screwed home, the spring-pawl engages one of the grooves in the bolt, and any attempt to turn the nut in the reverse direction will cause the point of the pawl to engage the square shoulder of the groove in which it is located, and thereby lock the nut firmly in place.

In order to unscrew the nut from the bolt, it is first necessary to insert a pointed instrument under the point of the spring-pawl and to raise the latter out of contact with the bolt, when the nut may be then turned freely in the reverse direction and unscrewed from the bolt.

Having thus described my invention, I claim—

The combination of the bolt having longitudinal grooves, provided with the square shoulders C on one side and the inclined shoulders D on the opposite side, the nut having the stud projecting from its face at one corner, and the latch formed from a single piece of bent wire and adapted to engage the grooves in the bolt, and consisting of the arm H, the eye at the upper end of said arm pivoted on the stud, and the arm L, extending from the said eye and bearing against one side of the bolt, substantially as described.

In testimony that I claim the foregoing as my own I have hereto affixed my signature in presence of two witnesses.

PETER LEWIS BRADY.

Witnesses:
J. G. HENNINGER,
W. O. HARRIS.